(12) United States Patent
Ruppel et al.

(10) Patent No.: US 12,459,494 B2
(45) Date of Patent: Nov. 4, 2025

(54) PARKING AND VENTILATION MANAGEMENT SYSTEMS FOR VEHICLE BATTERIES

(71) Applicant: Aptiv Technologies AG, Schaffhausen (CH)

(72) Inventors: Christopher David Ruppel, Carmel, IN (US); Shrinath Naik, Troy, MI (US); Bharat Gnanasekaran, Farmington Hills, MI (US)

(73) Assignee: Aptiv Technologies AG, Schaffhausen (CH)

( * ) Notice: Subject to any disclaimer, the term of this patent is extended or adjusted under 35 U.S.C. 154(b) by 505 days.

(21) Appl. No.: 18/045,004

(22) Filed: Oct. 7, 2022

(65) Prior Publication Data

US 2024/0116494 A1 Apr. 11, 2024

(51) Int. Cl.
*F24F 11/63* (2018.01)
*B60W 30/06* (2006.01)
(Continued)

(52) U.S. Cl.
CPC ............. *B60W 30/06* (2013.01); *E05F 15/71* (2015.01); *F24F 11/58* (2018.01); *F24F 11/63* (2018.01);
(Continued)

(58) Field of Classification Search
CPC .......... B60W 30/06; B60W 2510/246; B60W 2555/20; B60W 20/16; E05F 15/71;
(Continued)

(56) References Cited

U.S. PATENT DOCUMENTS

| 8,914,173 B2 | 12/2014 | Biondo et al. |
| 9,522,675 B1 | 12/2016 | You et al. |

(Continued)

FOREIGN PATENT DOCUMENTS

| CN | 108104556 A | * | 6/2018 |
| CN | 113284359 A | | 8/2021 |
| CN | 115257712 A | | 11/2022 |

OTHER PUBLICATIONS

"Extended European Search Report", EP Application No. 22198277.0, Apr. 28, 2023, 9 pages.

(Continued)

*Primary Examiner* — Alicia M. Choi
(74) *Attorney, Agent, or Firm* — Harness, Dickey & Pierce, P.L.C.

(57) ABSTRACT

This document describes techniques for parking and ventilation management systems for vehicle batteries. An example system includes a processor that determines whether a battery of a vehicle requires cooling. In response to a determination that the battery requires cooling, the processor determines where the vehicle is located (e.g., home garage or public location). If the vehicle is parked in the home garage, the processor requests a change in an initial state value of a home component (e.g., garage door) to reduce the ambient temperature of the home garage. If the vehicle is located in a public location, the processor determines a parking space with optimal thermal conditions (e.g., shaded or fewer surrounding vehicles) and autonomously operates the vehicle to the selected parking space. In this way, the described system can manage ambient conditions to improve temperature management of vehicle batteries, thereby improving their reliability and longevity.

16 Claims, 6 Drawing Sheets

(51) Int. Cl.
*E05F 15/71* (2015.01)
*F24F 11/58* (2018.01)
*H01M 10/48* (2006.01)

(52) U.S. Cl.
CPC .... *H01M 10/486* (2013.01); *B60W 2510/246* (2013.01); *B60W 2555/20* (2020.02); *E05Y 2400/45* (2013.01); *E05Y 2900/106* (2013.01); *H01M 2220/20* (2013.01)

(58) Field of Classification Search
CPC .. E05F 15/70; F24F 11/58; F24F 11/63; F24F 11/0001; F24F 11/64; F24F 11/88; H01M 10/486; H01M 2220/20; H01M 10/625; H01M 10/633; H01M 10/635; E05Y 2400/45; E05Y 2900/106; E05Y 2900/132; B62D 15/0285; B60L 2240/545; B60L 2260/56; B60L 58/24; B60L 58/26; B60L 3/0046; Y02E 60/10; B60H 1/00428; B60R 16/0232
See application file for complete search history.

(56) References Cited

U.S. PATENT DOCUMENTS

| | | | |
|---|---|---|---|
| 9,738,287 | B2 | 8/2017 | Bolger et al. |
| 9,914,462 | B2 | 3/2018 | Porras et al. |
| 9,944,282 | B1* | 4/2018 | Fields ................ G01C 21/3407 |
| 10,870,368 | B2 | 12/2020 | Ing et al. |
| 10,957,198 | B1 | 3/2021 | Hao |
| 2008/0028055 | A1 | 1/2008 | Dolev et al. |
| 2014/0340242 | A1 | 11/2014 | Belzner et al. |
| 2015/0010782 | A1* | 1/2015 | Tanigaki ................ H01M 10/63 429/7 |
| 2017/0026723 | A1 | 1/2017 | Wan et al. |
| 2017/0101030 | A1 | 4/2017 | Hughes et al. |
| 2017/0106874 | A1* | 4/2017 | Neubecker ............. G08B 17/06 |
| 2017/0115398 | A1* | 4/2017 | Li ............................. G01K 3/04 |
| 2017/0267233 | A1* | 9/2017 | Minster ................. B60W 30/06 |
| 2018/0072181 | A1 | 3/2018 | Christen et al. |
| 2018/0354502 | A1 | 12/2018 | Yaldo et al. |
| 2019/0272755 | A1* | 9/2019 | Giorgi ..................... H04W 4/40 |
| 2019/0333385 | A1 | 10/2019 | Wisbrun |
| 2020/0141174 | A1* | 5/2020 | Herman ................ B60L 53/305 |
| 2020/0258385 | A1 | 8/2020 | Mahajan |
| 2022/0097636 | A1 | 3/2022 | Beach et al. |
| 2022/0219679 | A1 | 7/2022 | Chen et al. |
| 2023/0063946 | A1* | 3/2023 | Salter ...................... B60R 25/24 |
| 2023/0282091 | A1* | 9/2023 | Padani ................... G08B 21/14 340/584 |
| 2024/0109420 | A1* | 4/2024 | Neely ....................... B60L 3/12 |

OTHER PUBLICATIONS

"Extended European Search Report", EP Application No. 23158945.8, Aug. 29, 2023, 10 pages.

"Extended European Search Report", European Application No. 22209241.3, Sep. 18, 2023, 5 pages.

Luo, et al., "A Statistical Method for Parking Spaces Occupancy Detection via Automotive Radars", 2017 IEEE 85th Vehicular Technology Conference (VTC Spring), Jun. 4, 2017, 5 pages.

* cited by examiner

PARKING AND VENTILATION MANAGEMENT SYSTEMS FOR VEHICLE BATTERIES

BACKGROUND

The reliability and longevity of vehicle batteries, especially high-capacity batteries, are affected by the temperature at which the batteries are maintained (e.g., soak temperature). Some vehicles provide cooling systems to manage the battery temperature. These systems, however, generally use on-vehicle heat exchange devices (e.g., fans), whose effectiveness is generally limited by ambient conditions (e.g., temperature, ventilation). In some environments, these systems are unable to effectively manage the battery temperature.

SUMMARY

This document describes techniques for parking and ventilation management systems for vehicle batteries. An example system includes a processor that determines whether a battery temperature is above a temperature threshold. In response to a determination that the battery temperature is above the temperature threshold, the processor determines where the vehicle is located. For example, the vehicle may be located in or near a home garage or in a public location. If the vehicle is parked in the home garage, the processor requests a change to an initial state value of a home component to reduce the ambient temperature of the home garage. The processor may cause the garage door to be partially opened to improve ventilation. In response to the battery temperature returning below the temperature threshold, the processor requests the initial state value of the home component to be restored. If the vehicle is in a public location, the processor determines a parking space with improved ambient conditions and autonomously operates the vehicle to the selected parking space. For example, the selected parking space may be shaded or separated from nearby vehicles to allow for improved ventilation and reduced reflective heat. In this way, the described system can manage ambient conditions to improve the temperature management of vehicle batteries, thereby improving their reliability and longevity.

This document also describes methods performed by the above-summarized system and other configurations set forth herein and computer-executable instructions and means for performing these methods.

This Summary introduces simplified concepts related to parking and ventilation management systems for vehicle batteries described in the Detailed Description and Drawings. This Summary is not intended to identify essential features of the claimed subject matter, nor is it intended to determine the scope of the claimed subject matter.

BRIEF DESCRIPTION OF THE DRAWINGS

The details of one or more aspects of parking and ventilation management systems and techniques for vehicles are described in this document with reference to the following figures. The same numbers are often used throughout the drawings to reference like features and components.

DETAILED DESCRIPTION

Overview

As described above, the reliability and longevity of vehicle batteries, especially high-capacity batteries, are affected by their temperature. Some vehicles use cooling systems to manage the battery temperature when the vehicle is parked. A vehicle may include heat exchange devices (e.g., fans), whose effectiveness is limited by the ambient conditions (e.g., temperature, ventilation) of the surrounding environment. If the ambient temperature is high, these systems are generally unable to effectively manage the battery temperature.

In contrast, this document describes techniques and systems for parking and ventilation management system to manage battery temperatures. As one example, a ventilation management system of a host vehicle determines whether the battery requires cooling. In response to determining that the battery requires cooling, a parking system determines where the host vehicle is located (e.g., in or near a home garage or a public location). In response to determining that the host vehicle is parked in a home garage, the ventilation management system requests an initial state value of a home component to be changed. For example, the garage door may be partially opened to improve ventilation in the home garage or lower the ambient temperature. In response to determining that the host vehicle is in a public location (e.g., parking lot, parking garage, roadway), the ventilation management system may obtain ambient environmental data and determine parking location for the host vehicle with optimal thermal conditions. The parking system may autonomously operate the host vehicle to park in the selected parking location. In this way, the described techniques and systems can manage ambient heat-soak conditions for vehicle batteries to improve their reliability and longevity.

This example is just one example of the described techniques and systems for parking and ventilation management systems for vehicles. This document describes other examples and implementations.

Operating Environment

Figure 1:
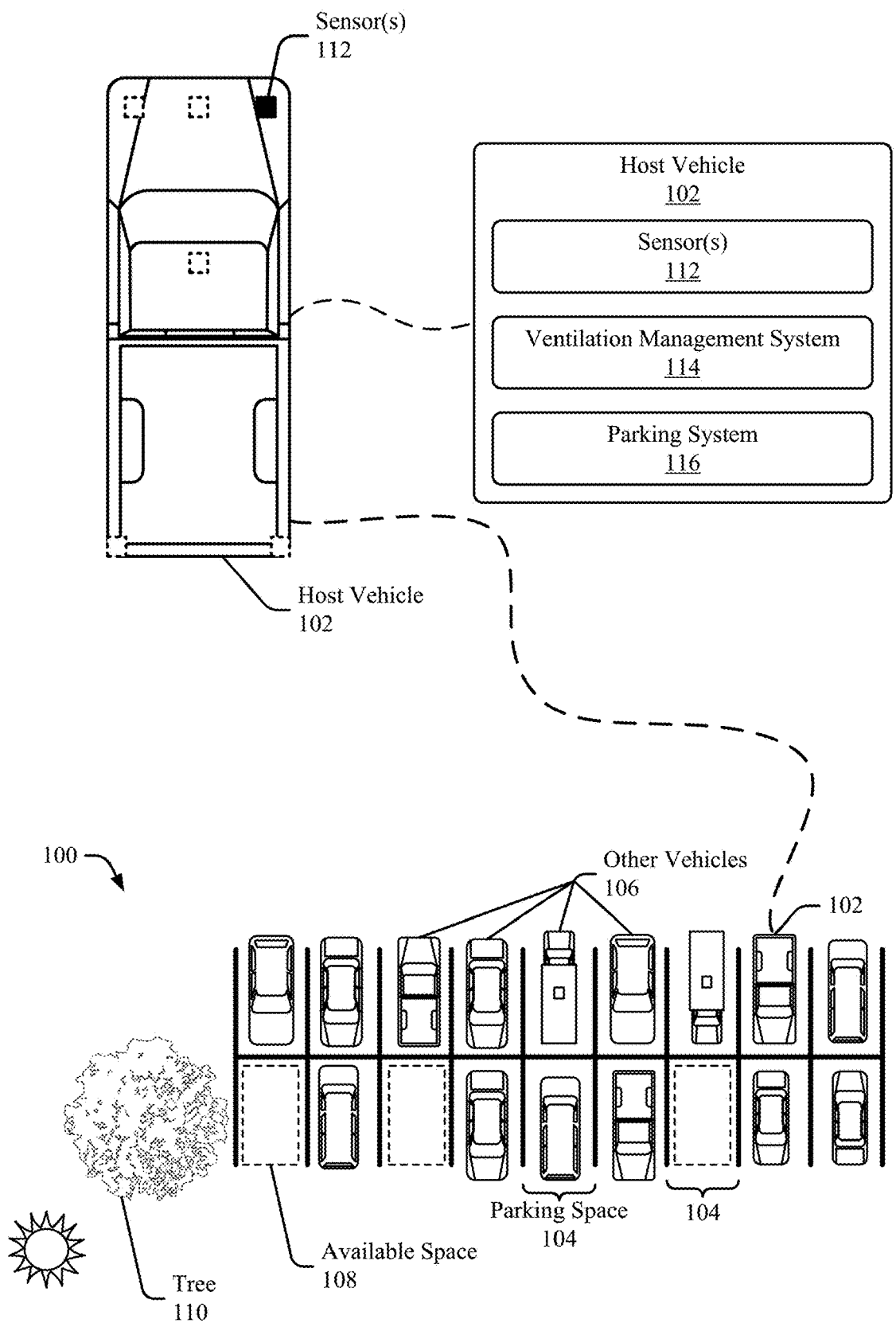
FIG. 1 illustrates an example environment in which parking and ventilation management systems can manage the battery temperature of a vehicle in accordance with techniques of this disclosure.

FIG. 1 illustrates an example environment 100 in which parking and ventilation management systems can manage the battery temperature of a host vehicle 102 in accordance with techniques of this disclosure. In the depicted environment 100, the host vehicle 102 is in a parking lot or other environment that includes multiple parking spaces 104. The environment 100 includes other vehicles 106 parked in some of the parking spaces 104. The environment 100 also includes multiple available spaces 108; in the depicted environment 100, there are three available spaces 108 including one near a tree 110.

Although illustrated as a passenger truck, the host vehicle 102 may be other types of motorized vehicles (e.g., a car, an automobile, a motorcycle, a bus, a tractor, a semi-trailer truck), watercraft (e.g., a boat), or aircraft (e.g., an airplane). Similarly, the other vehicles 106 may be other types of motorized vehicles, watercraft, aircraft, or other objects located in the parking spaces 104 (e.g., dumpsters, shopping carts).

The host vehicle 102 includes one or more sensors 112, a ventilation management system 114, and a parking system 116. In the depicted environment 100, the sensors 112 are mounted to, or integrated within, the host vehicle 102. As described in greater detail below, the sensors 112 can include camera systems, radar systems, lidar systems, thermal sensors, inertial measurement units (IMUs), global navigation satellite systems (GNSS), wheel-tick sensors, odometry sensors, ambient-light sensors, or ultrasonic systems. The sensors 112 can provide sensor data regarding the parking spaces 104, the other vehicles 106, and the available spaces 108 to the ventilation management system 114 and the parking system 116. In particular, the sensors 112 provide data regarding the surrounding environment to facilitate the selection of a parking space with optimal thermal conditions (e.g., a shaded parking space) and autonomous operation of the host vehicle 102 to parking in the selected parking space.

The ventilation management system 114 monitors the temperature of one or more components of the host vehicle 102. For example, the temperature of a high-capacity battery is monitored. In other implementations, the ventilation management system 114 can monitor the temperature of other internal components (e.g., one or more computer systems, electrical systems, engines, or mechanical systems requiring temperature management) or the interior cabin. In response to detecting a battery temperature that exceeds a threshold level, the ventilation management system 114 may request remote systems to change their state values to alter the ambient conditions in which the host vehicle 102 is parked. For example, if the host vehicle 102 is parked in a home garage of a driver, the ventilation management system 114 may request a garage door controller or opener to slightly open the garage door to improve the ventilation in the home garage and lower the ambient temperature.

The term home garage as used herein can represent a residential garage or a commercial garage (e.g., a home office location), or other location where the host vehicle 102 regularly parks in a garage environment in which the host vehicle 102 has permissions to control conditions at that location (e.g., controlling a garage door, controlling a heating, ventilation, and cooling or HVAC system). A public location as used herein refers to any location outside of one or more home garage locations where the host vehicle 102 has permission to control itself but not elements in its surroundings.

The ventilation management system 114 may also cause the parking system 116 or an autonomous-driving system (not illustrated in FIG. 1) to park the host vehicle 102 in another location with improved ambient conditions to manage the battery temperature. For example, the ventilation management system 114 may request the garage door to be opened and the parking system 116 to autonomously move the host vehicle 102 outside the home garage. In this way, the ventilation management system 114 can monitor and manage the battery temperature to improve battery reliability and longevity. The ventilation management system 114 can be implemented using hardware, software, firmware, or a combination thereof.

The parking system 116 can autonomously park the host vehicle 102 or provide inputs to an autonomous-driving system to manage the battery temperature in conjunction with the ventilation management system 114. As another example, the parking system 116 can identify a parking space with improved or optimal ambient conditions (e.g., shaded, fewer nearby vehicles for improved ventilation, concrete instead of asphalt paving) and perform a parking maneuver to move the host vehicle 102 to the selected parking space. The parking system 116 can be implemented using hardware, software, firmware, or a combination thereof. In this way, the parking system 116 can select and park the host vehicle 102 in the available space 108 providing improved ambient conditions and allowing for superior temperature management of vehicle components, including vehicle batteries.

Vehicle Configuration

Figure 2:
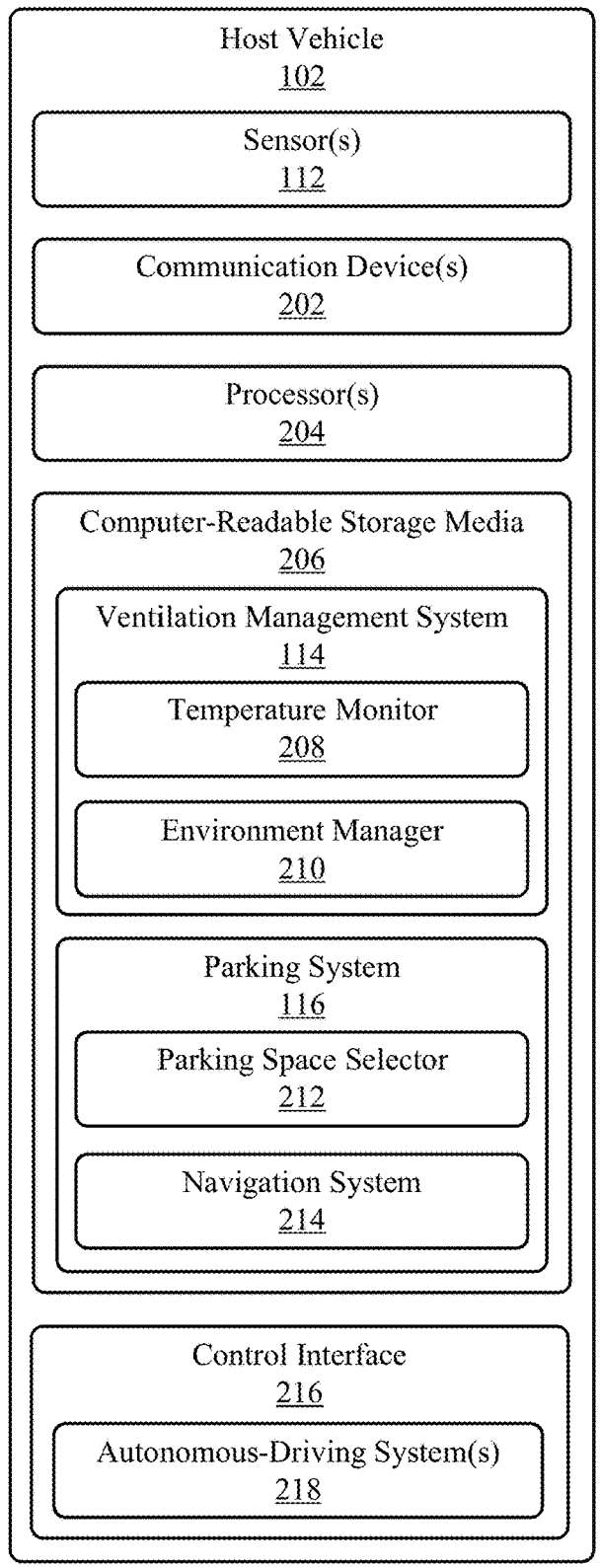
FIG. 2 illustrates an example configuration of a vehicle with parking and ventilation management systems that can manage the battery temperature of a vehicle.

FIG. 2 illustrates an example configuration of a vehicle with parking and ventilation management systems that can manage the battery temperature of the host vehicle 102. As described for FIG. 1, the host vehicle 102 includes the sensors 112, the ventilation management system 114, and the parking system 116. In addition, the host vehicle 102 may include one or more communication devices 202, one or more processors 204, computer-readable storage media (CRM) 206, and a control interface 216 to one or more vehicle-based systems, including one or more autonomous-driving systems 218.

The communication devices 202 may include a sensor interface and a vehicle-based system interface. The sensor interface and the vehicle-based system interface transmit data (e.g., radar data, images from a camera system, and other sensor data) over a communication bus of the host vehicle 102, for example, when the individual components of the sensors 112, ventilation management system 114, and/or the parking system 116 are integrated within the host vehicle 102. The communication devices 202 may also facilitate the exchange of data, including outside temperature and weather forecasts, over a wireless link between a remote system and the host vehicle 102. The communication devices 202 may include hardware, software, and/or firmware required to communicate via Wi-Fi, wireless local area networks (WLANs), Dedicated Short-Range Communication, Vehicle-to-Everything (V2X), or cellular communication.

The processors 204 (e.g., energy processing units or electronic control units) may be a microprocessor or a system-on-chip. The processors 204 execute instructions stored in the CRM 206, on one or more disks, memories, or other non-transitory computer-readable storage medium. For example, the processors 204 process sensor data from the sensors 112 and execute instructions loaded from the CRM 206 to cause the processors 204 to determine whether the battery temperature is above a threshold temperature and cause the ventilation management system 114 to manage remote systems to improve the ambient conditions. For example, the instructions may cause the processors 204 to be configured to select a parking space using the parking system 116 that improves the ambient conditions (e.g., a shaded parking space). The processors 204 execute the instructions on the CRM 206 to configure the processor 204 to control the autonomous-driving system 218 of the host vehicle 102 to cause the host vehicle 102 to park in the selected parking space.

The ventilation management system 114 can be stored in the CRM 206. The ventilation management system 114 may include a temperature monitor 208 and an environment manager 210. The temperature monitor 208 monitors the battery temperature. For example, the temperature monitor 208 can periodically compare the battery temperature to one or more threshold temperatures. If the battery temperature is above the threshold temperature(s), the temperature monitor 208 may provide an alert or notification to the environment manager 210. The temperature monitor 208 may also track the battery temperature and use machine-learned or other algorithms to determine a predicted battery temperature. Similarly, if the predicted battery temperature is above the threshold temperature(s), the temperature monitor 208 may alert or notify the environment manager 210.

In response to the battery temperature or the predicted battery temperature exceeding the threshold(s), the environment manager 210 determines where the host vehicle 102 is located or parked and, if possible (e.g., the host vehicle is parked in a home garage), controls remote systems to improve the ambient conditions of the host vehicle 102. For example, in response to the battery temperature exceeding a first threshold, the environment manager 210 sends a request to a garage door controller to partially open a garage door to improve ventilation in a home garage and reduce the ambient temperature. In response to the battery temperature exceeding a second threshold, the environment manager 210 sends a request to a heating, ventilation, and air conditioning (HVAC) controller to turn on air conditioning in the home garage. If the environment manager 210 is unable to send requests to remote systems (e.g., the host vehicle 102 is parked in a parking garage or a parking lot), the environment manager 210 can send a notification to the parking system 116.

The parking system 116 can be stored in the CRM 206. The parking system 116 may include a parking space selector 212 and a navigation system 214. The parking space selector 212 identifies the available spaces 108 and selects a parking space (e.g., a parking space with optimal thermal conditions) for the host vehicle 102 to reduce the battery temperature. The selected parking space can be presented to the navigation system 214. The navigation system 214 determines directions or instructions necessary to instruct the autonomous-driving system 218 to move the host vehicle 102 to the selected parking space. In this way, the parking system 116 can identify a parking space that provides improved ambient conditions to lower the battery temperature and cause the host vehicle 102 to move to that space.

The host vehicle 102 also includes the control interface 216 to one or more vehicle-based systems, which individually or in combination provide a way for receiving a parking-space selection and navigation instructions to control the host vehicle 102. Some examples of vehicle-based systems to which the control interface 216 supplies parking information include the autonomous-driving system 218, which may rely on information output from the parking system 116.

The autonomous-driving system 218 may also rely on data, which is communicated via the communication devices 202 and obtained from the sensors 112, to navigate the host vehicle 102. Generally, the autonomous-driving system 218 can use data provided by the parking system 116 and/or sensors 112 to control operations of the host vehicle 102 to park in selected parking spaces.

Example Methods

Figure 3:
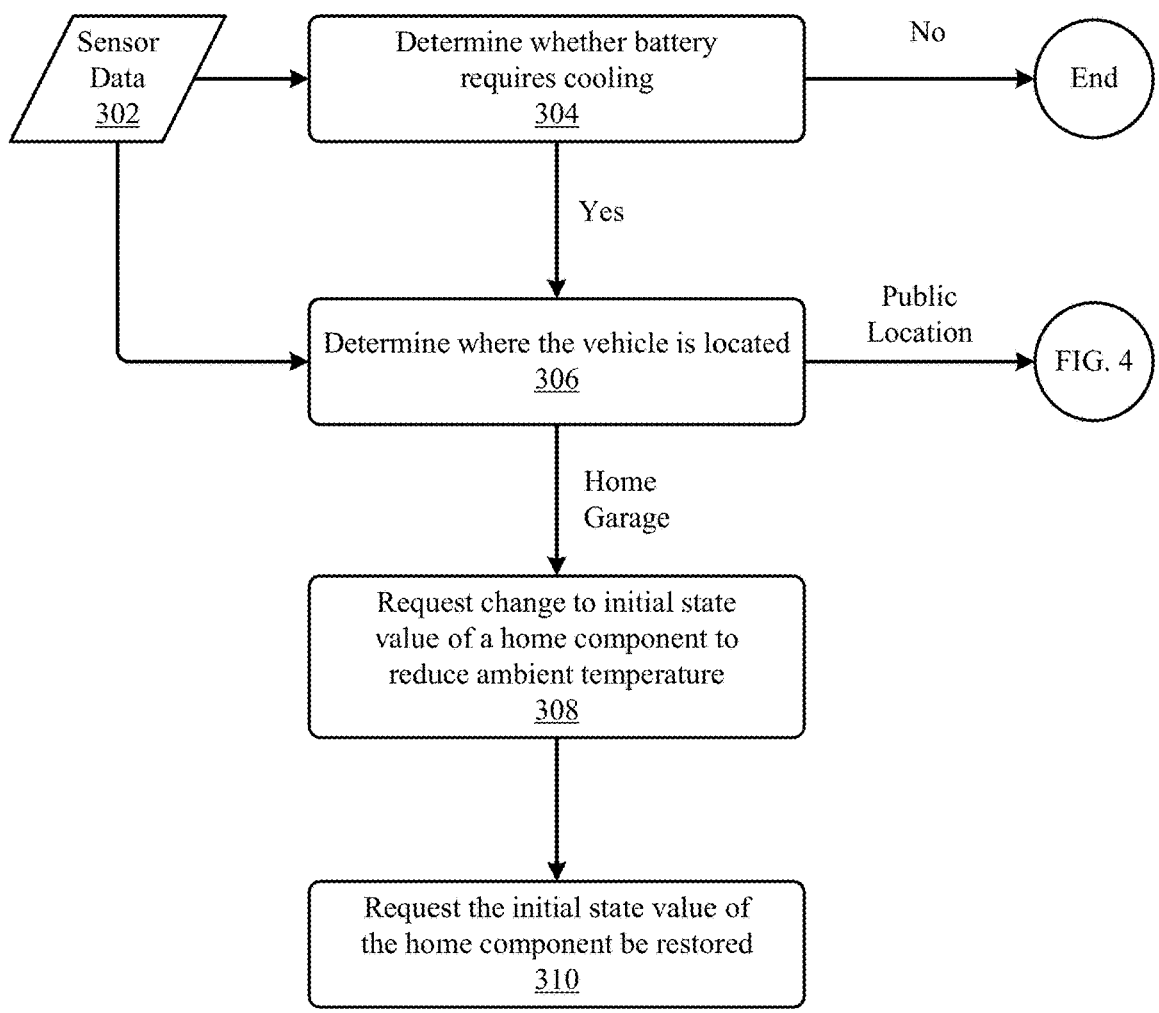
FIG. 3 illustrates an example method of a parking and ventilation management system to manage the battery temperature of a vehicle parked in a home garage.

FIG. 3 illustrates an example method 300 of parking and ventilation management systems to manage the battery temperature of a vehicle parked in a home garage. Method 300 is shown as operations (or acts) performed, but not necessarily limited to the order or combinations in which the operations are shown herein. Further, any one of one or more of the operations may be repeated, combined, or reorganized to provide other methods. In portions of the following discussion, reference may be made to the environment 100 of FIG. 1, and entities detailed in FIGS. 1 and 2, reference to which is made for example only. The techniques are not limited to performance by one entity or multiple entities.

At step 304, it is determined whether the battery of a host vehicle requires cooling. For example, the ventilation management system 114 or the temperature monitor 208 uses sensor data 302 to determine whether a temperature of the battery of the host vehicle 102 is above a temperature threshold. The sensor data 302 is provided by one or more thermistors, electronic battery sensors (EBS), or intelligent battery sensors (IBS). The temperature monitor 208 may determine cooling is required by comparing the battery temperature or a projected battery temperature to one or temperature thresholds. As examples, a first temperature threshold may be set at 100 degrees Fahrenheit and a second temperature threshold may be set at 115 degrees Fahrenheit. The temperature monitor 208 may determine the projected battery temperature using a time-average change in the battery temperature to estimate a future battery temperature (e.g., in ten minutes or an hour). The temperature monitor 208 may also use a machine-learned algorithm with at least one of the battery temperature overtime, the ambient temperature, a projected ambient temperature, and a charging state of the battery as inputs.

At step 306, in response to a determination that the battery requires cooling, it is determined where the host vehicle is located. For example, in response to determining that the battery temperature or the predicted battery temperature exceeds the temperature threshold, the ventilation management system 114 determines where the host vehicle 102 is parked or located. For example, the ventilation management system 114 determines whether the host vehicle 102 is parked in a home garage or a public location (e.g., a parking lot, parking garage, parking structure, side of a roadway).

The ventilation management system 114 may use various sensor data 302 to determine that the host vehicle 102 is parked in the home garage or a public location. For example, a camera (e.g, an image of the area in front of the host vehicle 102) or GNSS sensor (e.g., location information for the host vehicle 102) may be used to determine where the host vehicle 102 is located. Similarly, a network connection of the communication device 202 to a WiFi or WLAN link associated with the home garage may indicate that the host vehicle 102 is parked in the home garage.

At step 308, in response to a determination that the host vehicle is parked in the home garage, a change to an initial state value of a home component is requested to reduce the ambient temperature of the home garage. For example, the environment manager 210 can request a change in an initial state value of a home component to reduce the ambient temperature of the home garage or move the host vehicle 102 to an area (e.g., a home driveway) with a lower ambient temperature.

In one example, the home component is a garage door controller or opener. The environment manager 210 may request that the garage door controller at least partially open the garage door to increase ventilation in the home garage in response to the battery temperature or the predicted battery temperature exceeding the temperature threshold or the first temperature threshold. Before partially opening the garage door, the environment manager 210 may perform a security check to verify that a door from the home garage into the home is locked. Alternatively, the environment manager 210 may request user permission to open the garage door by sending a authorization request to a remote computer system (e.g., a smartphone) or an application (e.g., email application or home security application) associated with the user of the host vehicle 102. The environment manager 210 may also request the garage door controller open the garage door and cause the autonomous-driving system 218 to park the host vehicle 102 outside the home garage. As another example, the environment manager 210 may request an HVAC system associated with the home garage to lower the ambient temperature of the home garage.

At step 310, in response to a cooling threshold being satisfied, the restoration of the initial state value of the home component is requested. For example, the environment manager 210 requests that the initial the state value of the home component to be restored in response to a predefined time elapsing (e.g., one hour) or the battery temperature being lower than the one or more temperature threshold(s). If the garage door was partially opened, the environment manager 210 requests that the garage door be closed. If the HVAC system was turned on or set to a lower temperature, the environment manager 210 requests that the HVAC system be turned off or returned to its previous temperature setting. If the host vehicle 102 was parked in the driveway or outside the home garage, the environment manager 210 causes the host vehicle 102 to be returned inside the home garage.

Figure 4:
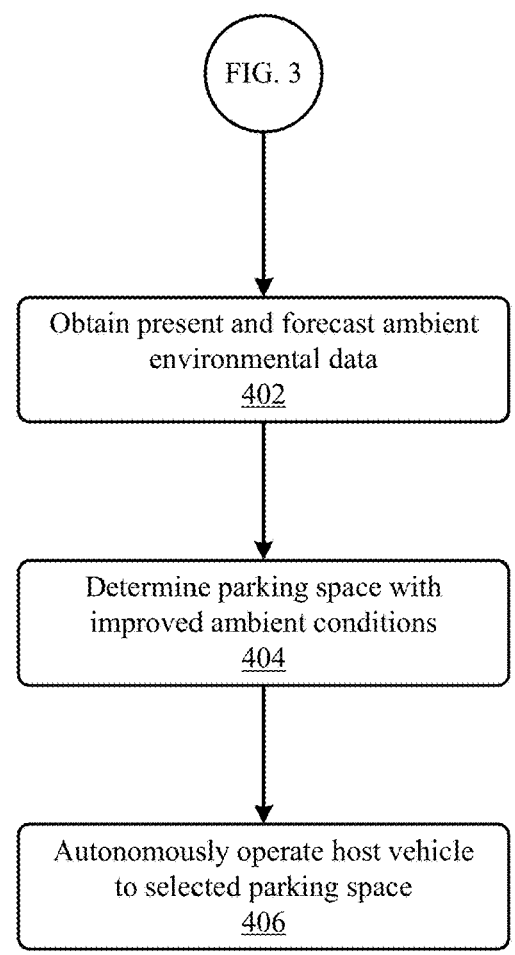
FIG. 4 illustrates a flowchart of an example process of a parking and ventilation management system to manage the battery temperature of a vehicle parked in a public location.

FIG. 4 illustrates a flowchart of an example process 400 of parking and ventilation management systems to manage the battery temperature of a vehicle parked in a public location. Process 400 is shown as operations (or acts) performed, but not necessarily limited to the order or combinations in which the operations are shown herein. Further, any one of one or more of the operations may be repeated, combined, or reorganized to provide other methods, including with those of method 300. In portions of the following discussion, reference may be made to the environment 100 of FIG. 1, and entities detailed in FIGS. 1 and 2, reference to which is made for example only. The techniques are not limited to performance by one entity or multiple entities.

As described with reference to step 304 of FIG. 3, the ventilation management system 114 or the temperature monitor 208 uses sensor data 302 to determine whether the battery of the host vehicle 102 requires cooling. In response to a determination that the battery requires cooling and as described with reference to step 306 of FIG. 3, it is determined whether the host vehicle is located in a home garage or a public location. If it is determined that the host vehicle 102 is parked in a public location, then the ventilation management system 114 proceeds with the process 400 to determine a parking space with optimal thermal conditions in which the battery temperature can be lowered.

Process 400 can also represent a series of steps taken by the host vehicle 102 before an automatic parking maneuver begins. For example, a driver of the host vehicle 102 can arrive at a destination. Upon arrival, the driver exits the host vehicle 102 and instructs the host vehicle 102 to automatically park (e.g., perform an automatic valet parking function). The host vehicle 102 may then proceed to perform process 400 to determine a parking space with optimal thermal conditions to maintain the battery temperature under the temperature thresholds.

At step 402, in response to a determination that the host vehicle is parked in a public location, ambient environment data is obtained. For example, the environment manager 210 can collect present and forecast environment data for a vicinity near the public location. The environment data may include camera data (e.g., from an onboard camera system or an infrastructure camera) that identifies sun loading or shade available for certain parking spaces to identify shaded parking spaces and car congestion for the parking spaces to identify nearby occupied and unoccupied parking spaces. It may also include camera data (e.g., from an onboard camera, infrastructure camera, or satellite image) that identifies the roadway type(s) of the parking spaces (e.g., spaces with concrete or gravel surfaces as opposed to asphalt, which may radiate a larger amount of heat to the host vehicle 102 and the battery). The environment data may also include weather forecasts for the vicinity or daily temperature trends for the area.

At step 404, a parking space with improved ambient conditions is determined. For example, the parking space selector 212 processes the environment data to determine a parking space with improved or optimal thermal conditions. The selected parking space can maximize shade time, maximize airflow (e.g., via minimization of other vehicles parked nearby), avoid other nearby vehicles to reduce reflective sun loading, or be in the shadow of a large vehicle (e.g., a semi-trailer truck or moving truck).

At step 406, the vehicle is autonomously operated to the selected parking space. For example, the parking system 116 or the navigation system 214 can provide instructions to the autonomous-driving system 218 to autonomously or automatically park the host vehicle 102 in the selected parking space.

The ventilation management system 114 can repeat the process 400 or a portion thereof once the host vehicle 102 is parked in the selected parking space. For example, the temperature monitor 208 uses sensor data 302 to determine whether battery temperature is above the temperature threshold at a later time (e.g., one hour later) or periodically (e.g., every thirty minutes). In response to a determination that the battery temperature is above the temperature threshold, the environment manager 210 can obtain updated environment data for the public location. The parking space selector 212 may then determine if another parking space provides improved thermal conditions. If another parking space is identified with improved thermal conditions, the parking system 116 or the navigation system 214 can provide instructions to the autonomous-driving system 218 to autonomously or automatically park the host vehicle 102 in the new parking space.

Figure 5:
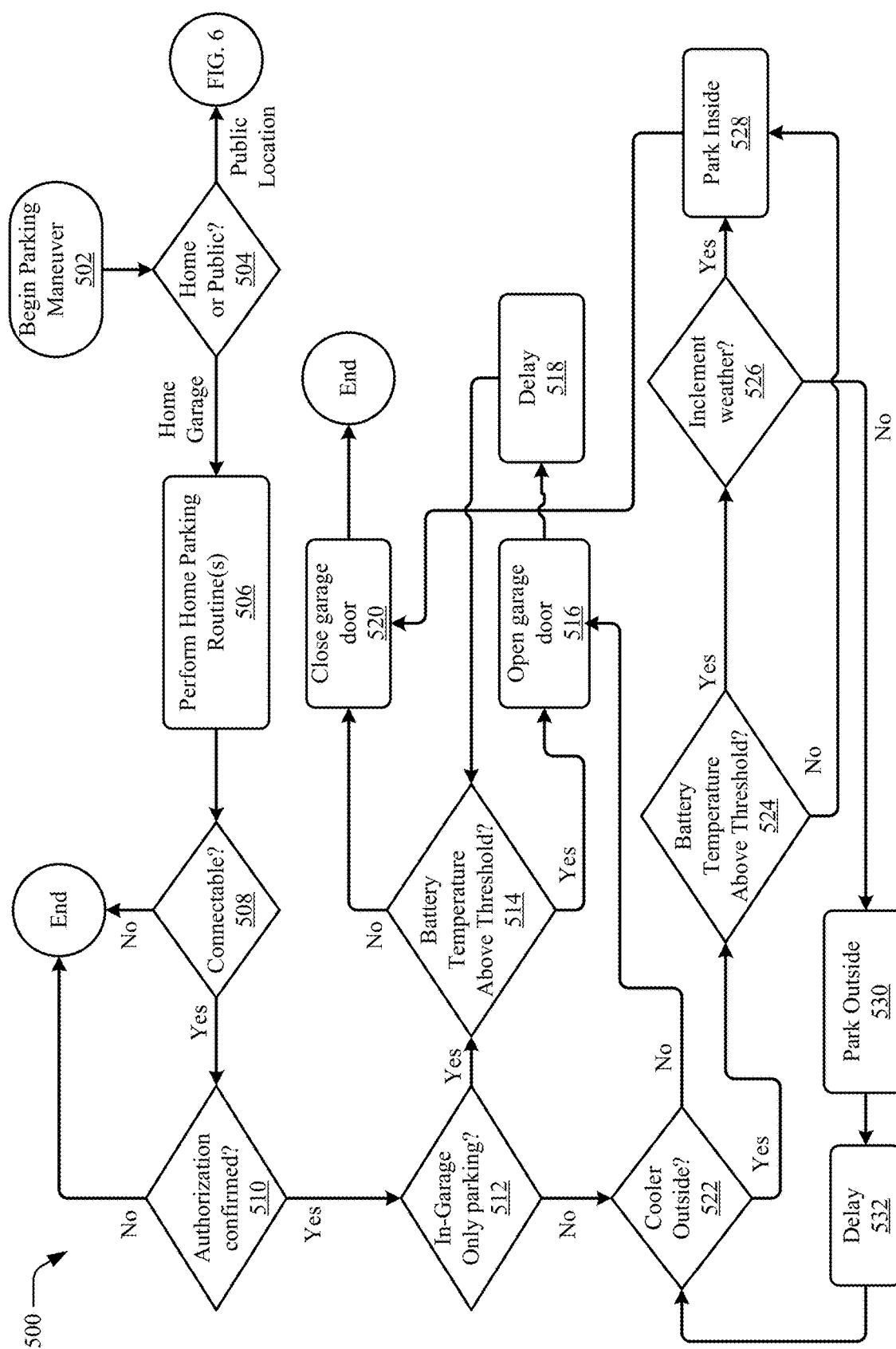
FIG. 5 illustrates a flowchart of an example process for a parking and ventilation management system to manage the battery temperature of a vehicle parking in a home garage.

FIG. 5 illustrates a flowchart of an example process 500 for parking and ventilation management systems to manage the battery temperature of a vehicle parking in a home garage. The parking system and ventilation management system that performs the process 500 can, for example, be the ventilation management system 114 and the parking system 116 of FIGS. 1-4. Process 500 is shown as operations (or acts) performed or determinations made but is not necessarily limited to the order or combinations in which the operations or determinations are shown herein. Further, any one of one or more of the operations or determinations may be repeated, combined, or reorganized to provide other flowcharts. In portions of the following discussion, reference may be made to the environment 100 of FIG. 1, and entities detailed in FIGS. 1 and 2, reference to which is made for example only. The techniques are not limited to performance by one entity or multiple entities.

At step 502, the parking system 116 or the autonomous-driving system 218 begins a parking maneuver. The parking maneuver includes an automatic valet parking or similar function. For example, the user or driver of the host vehicle 102 may arrive at a destination, exit the host vehicle 102, and initiate the parking maneuver. In other implementations, the process 500 can initiate at step 504 a set time (e.g., 30 minutes) after the host vehicle 102 is parked.

At step 504, the environment manager 210 determines whether the host vehicle is located at or near the driver's home. As described with respect to FIG. 3, the environment manager 210 may use an image from an onboard camera, localization information from a GNSS sensor, or connection to a home WLAN or Internet-of-Things (IoT) network to make this determination. If the environment manager 210 determines that the host vehicle 102 is located in a public location (e.g., not at or near the driver's home), then the ventilation management system 114 proceeds to FIG. 6.

At step 506, if the environment manager 210 determines that the host vehicle 102 is located at or near the driver's home, the parking system 116 and/or the navigation system 214 interfaces with the autonomous-driving system 218 to perform one or more home parking routine(s) (e.g., park the host vehicle 102 in a garage). If the host vehicle 102 is already parked at or near the driver's home, then the ventilation management system 114 may proceed to step 508.

At step 508, the environment manager 210 determines whether the house, garage or components thereof are connectable (e.g., over a WLAN network or IoT network). For example, the environment manager 210 may be able to connect to a garage door controller, a home HVAC system associated with the garage, or a door lock for a door that connects the garage to the home. Similarly, the environment manager 210 can determine whether the connection with the home component(s) has been established. If the home components are not connectable or not able to be connected at the moment (e.g., WLAN network or IoT network failure), then the ventilation management system 114 ends the routine. In some implementations, in response to connection failure, the ventilation management system 114 may restart the routine or process 500 after a predefined time (e.g., 30 minutes).

At step 510, in response to a determination that the home components are connectable, the ventilation management system 114 confirms whether user authorization exists for parking and ventilation management. The user or driver may give general authorization for parking and ventilation management for a specific location (e.g., at home), for a specific period (e.g., weekdays, summer months), or in all situations. The ventilation management system 114 may also request user authorization each time the host vehicle is parked. If user authorization is not confirmed, the ventilation management system 114 ends the routine.

At step 512, in response to confirming user authorization, the ventilation management system 114 determines whether a user preference exists to limit parking to in-garage-only parking. For example, the driver may interact with a user interface in the host vehicle 102 or an application on a smartphone associated with the host vehicle 102 to indicate user preferences for parking outside a home garage. The driver may restrict parking at their home to the home garage. Similarly, the driver may limit parking outside of the home garage to a certain length of time (e.g., two hours) or certain weather conditions.

At step 514, in response to determining that the user preference restricts parking to in-garage parking, the temperature monitor 208 determines whether the battery temperature is above a temperature threshold. As described with respect to FIG. 3, the temperature monitor 208 may also determine a predicted battery temperature that accounts for heating associated with the battery being charged.

At step 516, in response to determining that the battery temperature or predicted battery temperature is above the temperature threshold, the environment manager 210 sends a request to a garage door controller to open the garage door (e.g., via a WLAN or IoT connection) or causes the garage door to remain open. In this way, the ventilation in the garage is increased and the ambient conditions allow the onboard ventilation system to lower the battery temperature. Similarly, the environment manager 210 may request an HVAC controller to lower the temperature of the home garage. In some implementations, the HVAC request may be sent in response to the battery temperature or the predicted battery temperature exceeding a second temperature threshold or if the outside temperature is greater than the ambient temperature of the home garage.

At step 518, the ventilation management system 114 delays the routine illustrated in process 500 before returning to step 514. For example, the ventilation management system 114 may delay thirty minutes (or another predefined period) before proceeding back to step 514.

At step 520, in response to determining that the battery temperature or predicted battery temperature is not above the temperature threshold, the environment manager 210 sends a request to the garage door controller to close the garage door (e.g., via a WLAN or IoT connection) or causes the garage door to remain closed. The ventilation management system 114 then ends the routine.

At step 522, in response to determining that the user preference does not restrict parking to in-garage parking, the environment manager 210 determines whether the outdoor temperature is cooler than the indoor (e.g., ambient garage) temperature. The environment manager 210 can obtain the outdoor temperature from an onboard exterior temperature sensor, an online database providing the local temperature for the home area, or a home sensor (e.g., a HVAC unit with an external temperature sensor or a weather unit). Similarly, the indoor temperature can be determined from the onboard exterior temperature sensor (e.g., if the host vehicle is already parked in the garage) or the home sensor (e.g., an HVAC unit). If the outdoor temperature is not cooler than the indoor temperature, the ventilation management system 114 proceeds to step 516 to request the garage door be opened to finish the parking maneuver.

At step 524 (and similar to step 514), in response to determining that the outdoor temperature is cooler than the indoor temperature, the temperature monitor 208 determines whether the battery temperature or the predicted battery temperature is above the temperature threshold.

At step 526, in response to determining that the battery temperature or the predicted battery temperature is above the temperature threshold, the environment manager 210 determines whether inclement weather exists or is forecasted. Inclement weather may include hail, snow, strong winds, or thunderstorms. User preferences may also be received to determine inclement weather. The environment manager 210 may determine that inclement weather is occurring or may soon occur via an online database providing weather forecasts for the home area or a weather sensor in or near the home.

At step 528, in response to determining that the battery temperature or predicted battery temperature is not above the temperature threshold or that inclement weather exists or is forecasted, the parking system 116 causes the host vehicle 102 to be parked inside the garage. The environment manager 210 then proceeds to step 520 to close the garage door once the parking maneuver is completed.

At step 530, in response to determining that inclement weather does not exist or is not forecasted, the parking system 116 causes the host vehicle 102 to be parked outside the garage (e.g., in the driveway). At step 532, the ventilation management system 114 delays the routine of the process 500 before returning to step 522.

Figure 6:
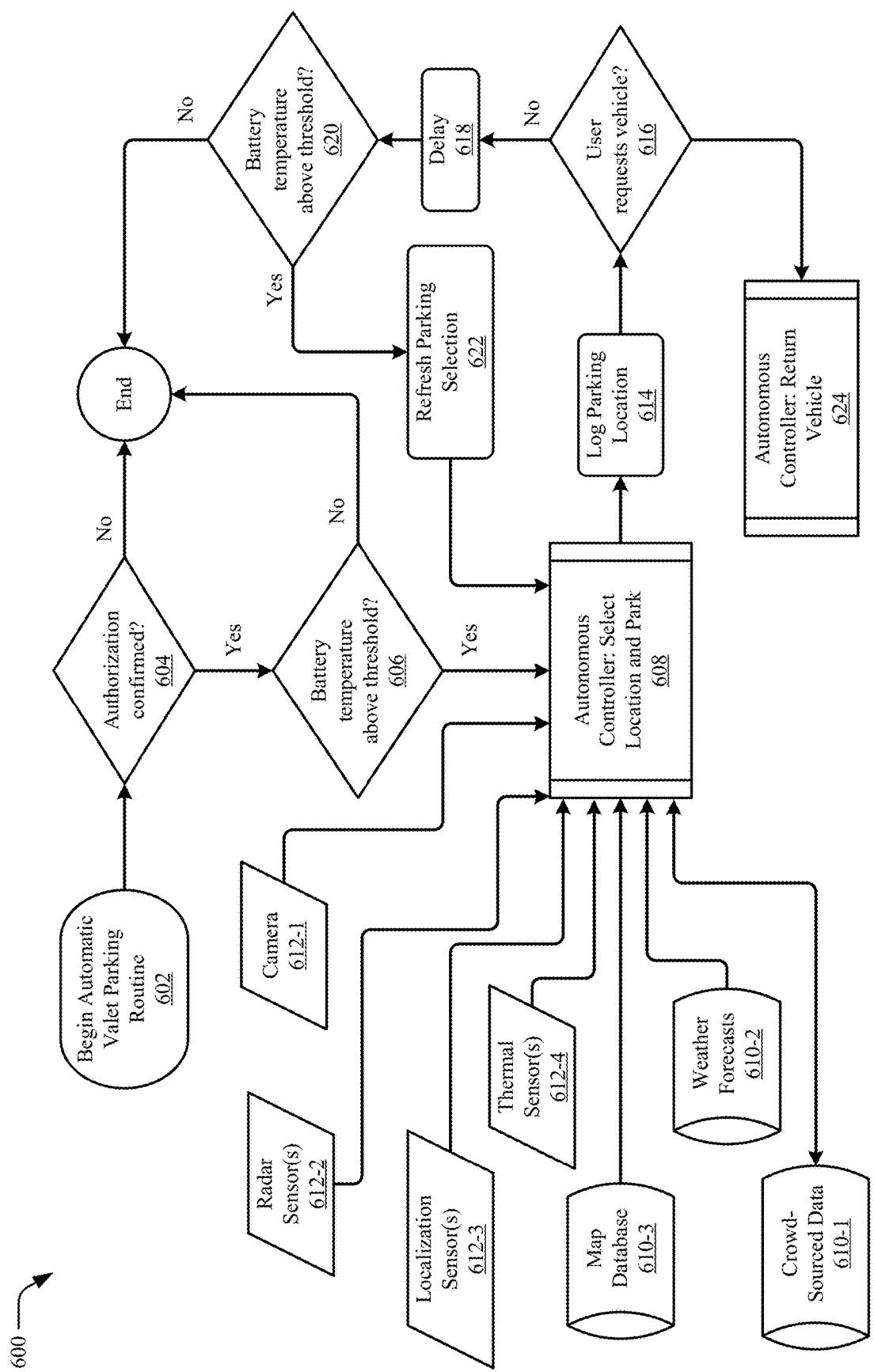
FIG. 6 illustrates a flowchart of an example process for a parking and ventilation management system to manage the battery temperature of a vehicle parking in a public location.

FIG. 6 illustrates a flowchart of an example process 600 for parking and ventilation management systems to manage the battery temperature of a vehicle parking in a public location. The parking system and ventilation management system that performs the process 600 can, for example, be the ventilation management system 114 and the parking system 116 of FIGS. 1-4. Process 600 is shown as operations (or acts) performed or determinations made but is not necessarily limited to the order or combinations in which the operations or determinations are shown herein. Further, any one of one or more of the operations or determinations may be repeated, combined, or reorganized to provide other flowcharts. In portions of the following discussion, reference may be made to the environment 100 of FIG. 1, and entities detailed in FIGS. 1 and 2, reference to which is made for example only. The techniques are not limited to performance by one entity or multiple entities.

At step 602, the parking system 116 begins an automatic valet parking routine for a public location. For example, the user or driver of the host vehicle 102 arrives at a destination, exits the host vehicle 102, and initiates automatic valet parking. In other implementations, the routine of process 600 can initiate at step 604 (or another step) a predefined time (e.g., 30 minutes) after the host vehicle 102 is parked in a public location (e.g., a parking lot or parking garage).

At step 604, the ventilation management system 114 confirms whether user authorization exists for parking and ventilation management. The user or driver may give general authorization for parking and ventilation management for a specific location (e.g., at a parking garage associated with the user's workplace), for a specific period (e.g., weekdays, summer months), or in all situations. The ventilation management system 114 may also request user authorization each time the host vehicle 102 is parked. If user authorization is not confirmed, the ventilation management system 114 ends the routine.

At step 606, in response to confirming user authorization, the temperature monitor 208 determines whether the battery temperature is above a temperature threshold. The temperature monitor 208 may also determine a predicted battery temperature that accounts for heating associated with the battery being charged, current thermal conditions, and predicted thermal conditions. If the battery temperature or the predicted battery temperature is not above the temperature threshold, the ventilation management system 114 ends the routine, and the parking system 116 or the autonomous-driving system 218 executes or maintains the automatic valet parking with a static parking location.

At step 608, in response to determining that the battery temperature or predicted battery temperature is above the temperature threshold, the parking space selector 212 selects a parking location with optimized thermal characteristics. As described above, the parking space selector 212 can identify a parking space that is shaded or will be shaded (e.g., by building structures, trees, or other large vehicles), separated from other vehicles, covered with a less radiative surface (e.g., concrete or gravel versus asphalt), or subject to greater air movement. The parking system 116 can also cause the autonomous-driving system 218, in conjunction with the navigation system 214, to operate (e.g., steer, brake, and accelerate) the host vehicle 102 to the selected parking space and finish the automatic valet parking.

The parking space selector 212 can select the parking space using a variety of databases. For example, the parking space selector 212 can obtain crowd-sourced data 610-1 on parking lot temperatures and conditions for identified locations (e.g., via the Internet). The crowd-sourced data 610-1 may maintain an updated list of occupied parking spots and thermal conditions per parking spot. The parking system 116 may also publish data to the crowd-sourced data 610-1 based on collected sensor data. The parking space selector 212 may also obtain weather forecasts 610-2 (e.g., via the Internet) that include temperature forecasts throughout the day, sunrise time, sunset time, and overcasting. Similarly, the navigation system 214 may access a map database 610-3 to provide navigation instructions to the autonomous-driving system 218 to complete the automatic valet parking.

The parking space selector 212 may also select the parking space using a variety of sensor data, including data from camera(s) 612-1, radar sensor(s) 612-2, localization sensor(s) 612-3, and thermal sensor(s) 612-4. The cameras 612-1 may provide images of the public location that the parking space selector 212 processes to identify shadows for shaded parking spaces or the type of roadway material. Similarly, lidar sensors may be used to identify shadows. The radar sensors 612-2 may be used to localize the host vehicle 102 (e.g., in GNSS-denial environments) and perform the automatic valet parking function. The autonomous-driving system 218 may also use lidar and ultrasonic sensors to operate the host vehicle 102. The localization sensors 612-3 provide localization information for the host vehicle 102 to obtain relevant information (e.g., from the crowd-sourced data 610-1, weather forecasts 610-2, or the map database 610-3) and localize the vehicle during the parking routine. The localization sensors 612-3 may include GNSS or GPS sensors, inertial measurement units (IMUs), or odometers. The thermal sensors 612-4 may include infrared sensors that provide thermal characteristics for the public location.

At step 614, the parking system 116 logs the parking location. For example, the parking location may be provided as an alert or notification to the driver (e.g., via a smartphone application). The parking system 116 can also wait for final or interim vehicle moving requests.

At step 616, the parking system 116 determines whether the user or driver has requested (e.g., summoned) the host vehicle 102. At step 618, if the user has not requested the host vehicle 102, the ventilation management system 114 delays the routine of the process 600 before proceeding to step 620. For example, the ventilation management system 114 may wait thirty minutes (or another predefined period) before proceeding to step 620.

At step 620, the temperature monitor 208 determines whether the battery temperature is above the temperature threshold. The temperature monitor 208 may also determine a predicted battery temperature that accounts for heating associated with the battery being charged, current thermal conditions, or predicted thermal conditions. If the battery temperature or the predicted battery temperature is not above the temperature threshold, the ventilation management system 114 ends the routine, and the parking system 116 or the autonomous-driving system maintains the same parking location.

At step 622, in response to the battery temperature or the predicted battery temperature being above the temperature threshold, the parking space selector 212 refreshes the parking space selection. In particular, the parking space selector 212 may refresh the sensor data and database information to select a new parking space with improved thermal conditions. If a new parking space location is identified, the parking system 116 returns to step 608 to move the host vehicle 102 to the new parking space.

At step 624, if the user has requested the host vehicle 102, the parking system 116 causes the autonomous-driving system 218 to return the host vehicle 102 to the driver. The autonomous-driving system 218 can use the cameras 612-1, radar sensors 612-2, and localization sensors 612-3 to complete the summon function.

Examples

In the following section, examples are provided.

Example 1. A method comprising: determining whether a temperature of a battery of a host vehicle is above a temperature threshold; in response to determining that the temperature of the battery is above the temperature threshold, determining a location of the host vehicle; in response to determining that the host vehicle is located in a home garage associated with a user of the host vehicle, requesting a change to an initial state value of a home component to reduce an ambient temperature of the home garage; and in response to determining that the temperature of the battery is below the temperature threshold, requesting a restoration of the initial state value of the home component.

Example 2. The method of Example 1, wherein the method further comprises: in response to determining that the host vehicle is located in a public location, obtaining environment data for the public location, the public location including at least one of a parking lot, a parking structure, or a roadway; determining, based on the environment data for the public location, a parking space for the host vehicle; and autonomously operating the host vehicle to park in the selected parking space.

Example 3. The method of Example 2, wherein the environment data for the public location includes at least one of a weather forecast for the public location, an identification of shaded parking spaces, temperature trends for the public location, roadway types for the public location, or an identification of occupied parking spaces.

Example 4. The method of Example 2 or 3, wherein the method further comprises: in response to parking the host vehicle in the selected parking space, determining whether the temperature of the battery is above the temperature threshold; in response to determining that the temperature of the battery is above the temperature threshold, determining, based on updated environment data for the public location, a second parking space for the host vehicle to improve ambient conditions for managing the temperature of the battery; and autonomously operating the host vehicle to park in the second parking space.

Example 5. The method of any one of the preceding Examples, wherein a determination that the host vehicle is located in or near the home garage is determined using at least one of an image from a camera of the host vehicle, location information from a Global Navigation Satellite System (GNSS) sensor of the host vehicle, a network connection of a communication device of the host vehicle with a network associated with the home garage.

Example 6. The method of any one of the preceding Examples, wherein requesting a change to the initial state value of the home component includes at least one of: requesting a heating, ventilation, and air conditioning (HVAC) system connected to the home garage to lower the ambient temperature of the home garage; or requesting a garage door controller to at least partially open a garage door of the home garage.

Example 7. The method of Example 6, wherein the method further comprises: prior to requesting the garage door controller to at least partially open the garage door, verifying that a door from the home garage to an interior of a home of the user is locked.

Example 8. The method of any one of the preceding Examples, wherein: requesting the change to the initial state value of the home component comprises requesting a garage door controller to open a garage door of the home garage; and the method further comprises: determining that a temperature outside the home garage is lower than the ambient temperature of the home garage; autonomously operating the host vehicle to park outside the home garage; and in response to the host vehicle being parked outside the home garage, requesting the garage door controller to close the garage door.

Example 9. The method of Example 8, wherein the method further comprises: prior to autonomously operating the host vehicle to park outside the home garage, determining whether it is snowing or hailing outside the home garage; and in response to determining that it is snowing or hailing outside the home garage, requesting the garage door controller to partially open the garage door; or in response to determining that it is not snowing or hailing outside the home garage, autonomously operating the host vehicle to park outside the home garage.

Example 10. The method of Example 8 or 9, wherein the method further comprises: in response to parking the host vehicle outside the home garage, determining whether the temperature of the battery is below the temperature threshold; in response to determining that the temperature of the battery is below the temperature threshold, requesting the garage door controller to open the garage door; autonomously operating the host vehicle to park inside the home garage; and in response to the host vehicle being parked inside the home garage, requesting the garage door controller to close the garage door.

Example 11. The method of any one of the preceding Examples, wherein the method further comprises: prior to requesting the change to the initial state value of the home component, receiving user authorization to request changes to state values of one or more home components.

Example 12. The method of any one of the preceding Examples, wherein the temperature of the battery is determined using at least one of a thermistor, an electronic battery sensor, or an intelligent battery sensor.

Example 13. The method of any one of the preceding Examples, wherein determining whether the temperature of the battery is above the temperature threshold includes determining whether a predicted temperature, based on ambient conditions, is above the temperature threshold.

Example 14. A system comprising one or more processors configured to perform the method of any one of Examples 1 through 13.

Example 15. A non-transitory computer-readable medium that stores computer-executable instructions that, when executed by a processor, cause the processor to perform the method of any one of Examples 1 through 13.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the scope of the disclosure as defined by the following claims.

What is claimed is:

1. A method comprising:
    determining with a processor whether a temperature of a battery of a host vehicle is above a temperature threshold, the temperature measured by a temperature sensor and input to the processor;
    in response to the processor determining that the temperature of the battery is above the temperature threshold, determining with the processor and a navigation system a location of the host vehicle;
    in response to the processor determining that the location of the host vehicle is in a home garage associated with a user of the host vehicle, requesting with the processor and a communication device of the host vehicle a change to an initial state value of a home component to reduce an ambient temperature of the home garage;
    in response to the processor determining that the temperature of the battery is below the temperature threshold after being above the temperature threshold, requesting with the processor and the communication device of the host vehicle a restoration of the initial state value of the home component;
    in response to the processor determining that the host vehicle is located in a public location, obtaining with the processor and the communication device environment data for the public location, the public location including at least one of a parking lot, a parking structure, and a roadway;
    determining, with the processor based on the environment data for the public location, a first parking space for the host vehicle;
    operating a parking system of the host vehicle controlled by the processor to autonomously operate the host vehicle to park in the first parking space;
    in response to the processor parking the host vehicle in the first parking space, determining with the processor based on inputs from the temperature sensor whether the temperature of the battery is above the temperature threshold;
    in response to the processor determining that the temperature of the battery is above the temperature threshold and that the host vehicle is in the first parking space, determining with the processor, based on updated environment data for the public location, a second parking space for the host vehicle to improve ambient conditions for managing the temperature of the battery; and
    operating the parking system with the processor to autonomously operate the host vehicle to park in the second parking space with the parking system of the host vehicle controlled by the processor.

2. The method of claim 1, wherein the environment data for the public location includes at least one of a weather forecast for the public location, an identification of shaded parking spaces, temperature trends for the public location, roadway types for the public location, and an identification of occupied parking spaces.

3. The method of claim 1, wherein the determination that the host vehicle is located in or near the home garage is determined by the processor using at least one of an image from a camera of the host vehicle, location information from a Global Navigation Satellite System (GNSS) sensor of the host vehicle, and a network connection of a communication device of the host vehicle with a network associated with the home garage.

4. The method of claim 1, wherein the requesting of the change to the initial state value of the home component includes at least one of:
    requesting with the processor a heating, ventilation, and air conditioning (HVAC) system connected to the home garage to lower the ambient temperature of the home garage; and
    requesting with the processor a garage door controller to at least partially open a garage door of the home garage.

5. The method of claim 4, wherein the method further comprises:
    prior to requesting the garage door controller to at least partially open the garage door, verifying with the processor that a door from the home garage to an interior of a home of the user is locked.

6. The method of claim 1, wherein:
    requesting the change to the initial state value of the home component comprises requesting with the processor and the communication device of the host vehicle a garage door controller to open a garage door of the home garage; and
    the method further comprises:
        determining with the processor based on readings from the temperature sensor that a temperature outside the home garage is lower than the ambient temperature of the home garage;
        operating the parking system with the processor to autonomously operate the host vehicle to park outside the home garage; and
        in response to the host vehicle being parked outside the home garage, requesting with the processor and the communication device the garage door controller to close the garage door.

7. The method of claim 6, wherein the method further comprises:
    prior to autonomously operating the host vehicle to park outside the home garage, determining with an environment manager in cooperation with the processor whether it is snowing or hailing outside the home garage; and
    in response to determining that it is snowing or hailing outside the home garage, requesting with the processor by way of the communication device the garage door controller to partially open the garage door; or
    in response to determining that it is not snowing or hailing outside the home garage, autonomously operating the host vehicle with the parking system of the host vehicle controlled by the processor to park outside the home garage.

8. The method of claim 6, wherein the method further comprises:
    in response to parking the host vehicle outside the home garage, determining with the processor based on readings from the temperature sensor whether the temperature of the battery is below the temperature threshold;
    in response to determining that the temperature of the battery is below the temperature threshold, requesting with the processor and the communication device the garage door controller to open the garage door;
    autonomously operating the host vehicle with the parking system of the host vehicle controlled by the processor to park inside the home garage; and in response to the host vehicle being parked inside the home garage, requesting with the processor and the communication device the garage door controller to close the garage door.

9. The method of claim 1, wherein the method further comprises:
prior to requesting the change to the initial state value of the home component, receiving with the processor user authorization to request changes to state values of one or more home components.

10. The method of claim 1, wherein the temperature of the battery is determined by the processor using at least one of a thermistor, an electronic battery sensor, or an intelligent battery sensor.

11. The method of claim 1, wherein determining whether the temperature of the battery is above the temperature threshold includes determining with the processor whether a predicted temperature, based on ambient conditions, is above the temperature threshold.

12. A system comprising:
a temperature sensor of a host vehicle configured to measure a temperature of a battery of the host vehicle;
a processor of the host vehicle configured to receive the temperature from the temperature sensor and determine whether the temperature of the battery of the host vehicle is above a temperature threshold;
a navigation system configured to determine a location of the host vehicle and input the location to the processor, the processor further configured to determine whether the location of the host vehicle is in a home garage associated with a user of the host vehicle;
a parking system of the host vehicle configured to autonomously operate the host vehicle to park the host vehicle;
a communication device of the host vehicle configured to wirelessly communicate with a home component of a home of the user of the host vehicle to operate the home component to change an ambient temperature of the home garage;
wherein:
in response to the processor determining that the temperature of the battery is above the temperature threshold, the navigation system is configured to determine the location of the host vehicle and input the location to the processor;
in response to the processor determining that the host vehicle is located in the home garage associated with the user of the host vehicle, the processor is configured to request, by way of the communication device of the host vehicle, a change to an initial state value of a home component to reduce the ambient temperature of the home garage;
in response to the processor determining that the temperature of the battery is below the temperature threshold after being above the temperature threshold, the processor is configured to request, by way of the communication device of the host vehicle, a restoration of the initial state value of the home component;
in response to the processor determining that the host vehicle is located in a public location, the processor is configured to obtain, by way of the communication device, environment data for the public location, the public location including at least one of a parking lot, a parking structure, and a roadway, and the environment data for the public location including at least one of a weather forecast for the public location, an identification of shaded parking spaces, temperature trends for the public location, roadway types for the public location, and an identification of occupied parking spaces;
based on the environment data for the public location, the processor is further configured to identify a first parking space for the host vehicle;
in response to identifying the first parking space, the processor is configured to operate the parking system of the host vehicle to autonomously park the host vehicle in the first parking space;
in response to parking the host vehicle in the first parking space, the processor is configured to determine based on inputs from the temperature sensor whether the temperature of the battery is above the temperature threshold;
in response to the processor determining that the temperature of the battery is above the temperature threshold, the processor is further configured to determine, based on updated environment data obtained by the processor for the public location, a second parking space for the host vehicle at which ambient conditions for managing the temperature of the battery are improved; and
in response to identifying the second parking space, the processor is further configured to autonomously operate the parking system of the host vehicle to park in the second parking space.

13. The system of claim 12, wherein the request to change the initial state value of the home component includes at least one of:
request to a heating, ventilation, and air conditioning (HVAC) system connected to the home garage to lower the ambient temperature of the home garage; or
request to a garage door controller to at least partially open a garage door of the home garage.

14. The system of claim 12, wherein:
the request to change the initial state value of the home component comprises a request to a garage door controller to open a garage door of the home garage; and
the processor is further configured to:
determine that a temperature outside the home garage is lower than the ambient temperature of the home garage;
determine whether it is snowing or hailing outside the home garage;
in response to a determination that it is snowing or hailing outside the home garage, requesting the garage door controller to partially open the garage door; or
in response to a determination that it is not snowing or hailing outside the home garage, autonomously operate the host vehicle to park outside the home garage; and
in response to the host vehicle being parked outside the home garage, request the garage door controller to close the garage door.

15. The system of claim 14, wherein the processor is further configured to:
in response to parking the host vehicle outside the home garage, determine whether the temperature of the battery is below the temperature threshold;
in response to a determination that the temperature of the battery is below the temperature threshold, request the garage door controller to open the garage door;
autonomously operate the host vehicle to park inside the home garage; and in response to the host vehicle being parked inside the home garage, request the garage door controller to close the garage door.

16. A non-transitory computer-readable medium that stores computer-executable instructions that, when executed by a processor, cause the processor to:
   retrieve from a temperature sensor of a host vehicle a temperature of a battery of the host vehicle;
   determine whether the temperature of the battery of the host vehicle is above a temperature threshold;
   in response to determining that the temperature of the battery is above the temperature threshold, determine with a navigation system a location of the host vehicle;
   in response to determining that the host vehicle is located in a home garage associated with a user of the host vehicle, operate a communication device to request a change to an initial state value of a home component to reduce an ambient temperature of the home garage;
   in response to determining that the temperature of the battery is below the temperature threshold after being above the temperature threshold, operate the communication device to request a restoration of the initial state value of the home component;
   in response to determining that the host vehicle is located in a public location, obtain by way of the communication device environment data for the public location, the public location including at least one of a parking lot, a parking structure, and a roadway;
   identify a first parking space for the host vehicle based on the environment data for the public location;
   operate a parking system of the host vehicle to autonomously park the host vehicle in the first parking space;
   determine based on inputs to the processor from the temperature sensor whether the temperature of the battery is above the temperature threshold in response to the processor parking the host vehicle in the first parking space;
   determine based on updated environment data for the public location a second parking space for the host vehicle to improve ambient conditions for managing the temperature of the battery in response to the processor determining that the temperature of the battery is above the temperature threshold; and
   operate the parking system of the host vehicle to autonomously park the host vehicle in the second parking space.

* * * * *